Nov. 14, 1933.  W. FERRIS  1,935,551
BROACHING MACHINE
Original Filed June 1, 1926  8 Sheets-Sheet 2

INVENTOR
WALTER FERRIS.
BY
ATTORNEY

Nov. 14, 1933.　　　　　W. FERRIS　　　　　1,935,551

BROACHING MACHINE

Original Filed June 1, 1926　　8 Sheets-Sheet 3

INVENTOR
WALTER FERRIS.
BY
ATTORNEY

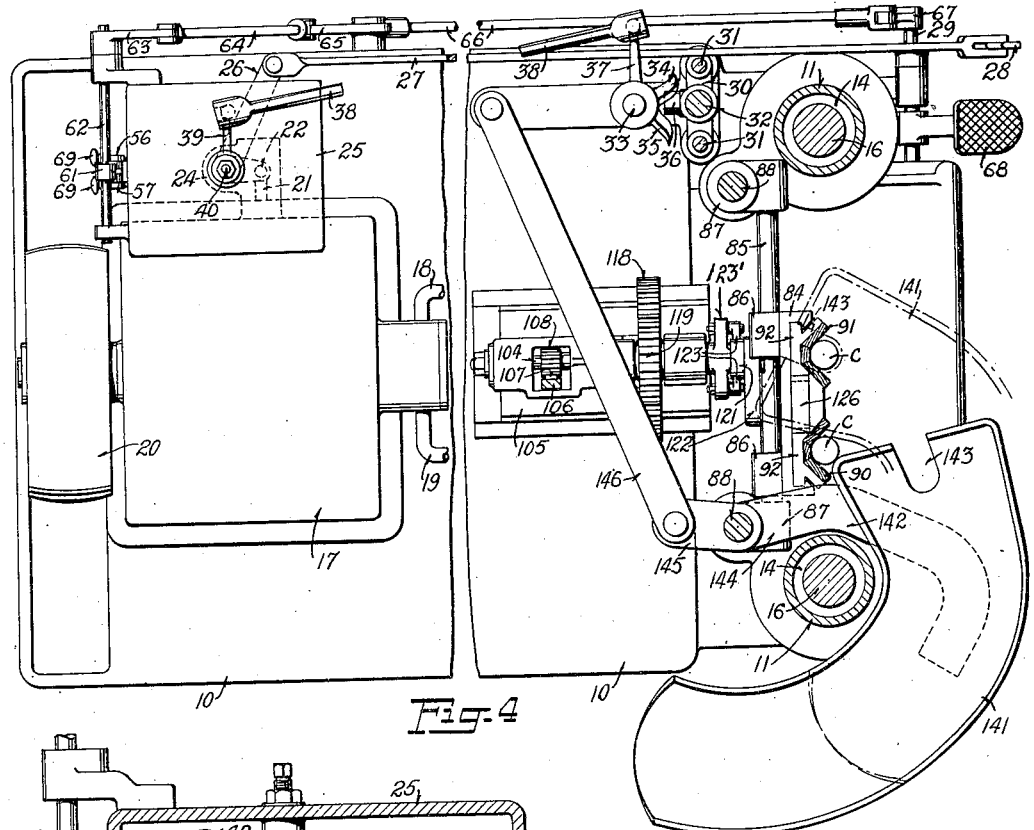
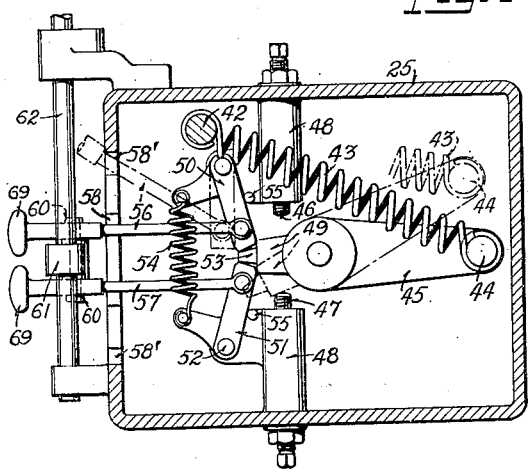
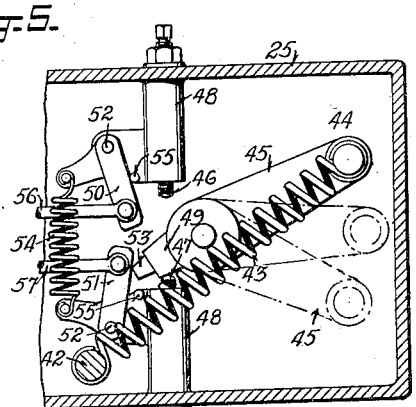

Nov. 14, 1933.  W. FERRIS  1,935,551
BROACHING MACHINE
Original Filed June 1, 1926  8 Sheets-Sheet 5
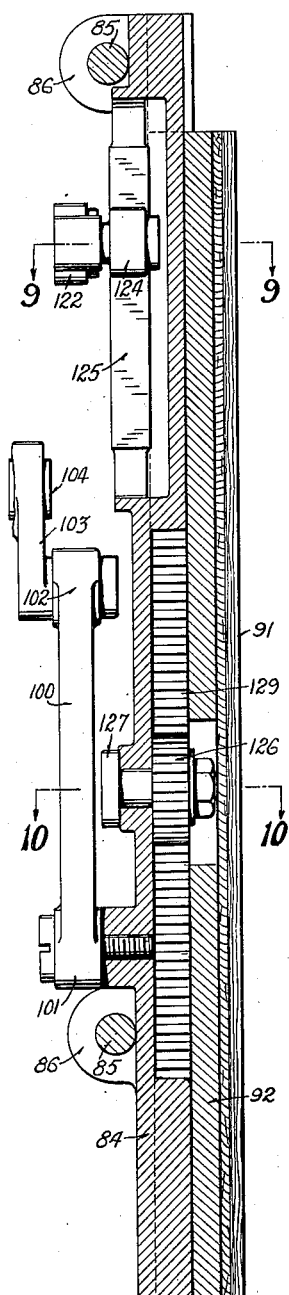
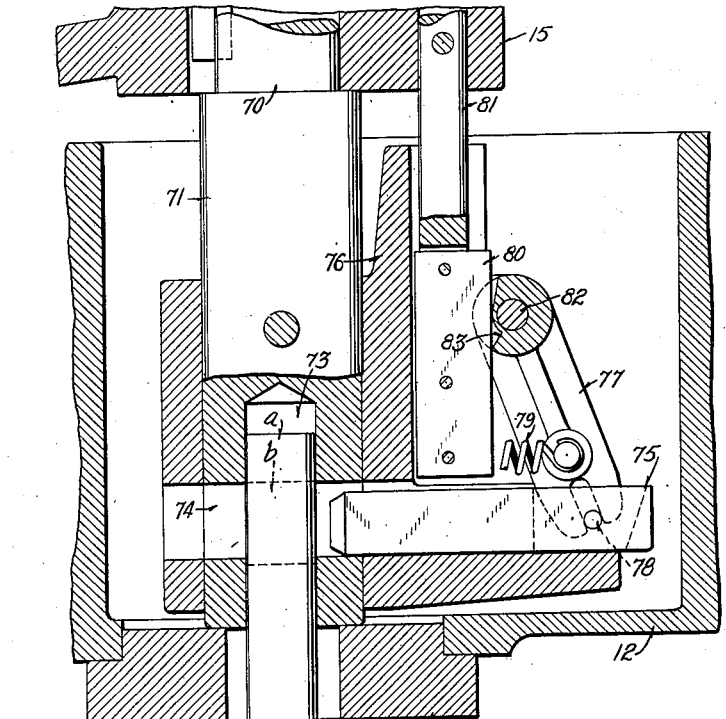
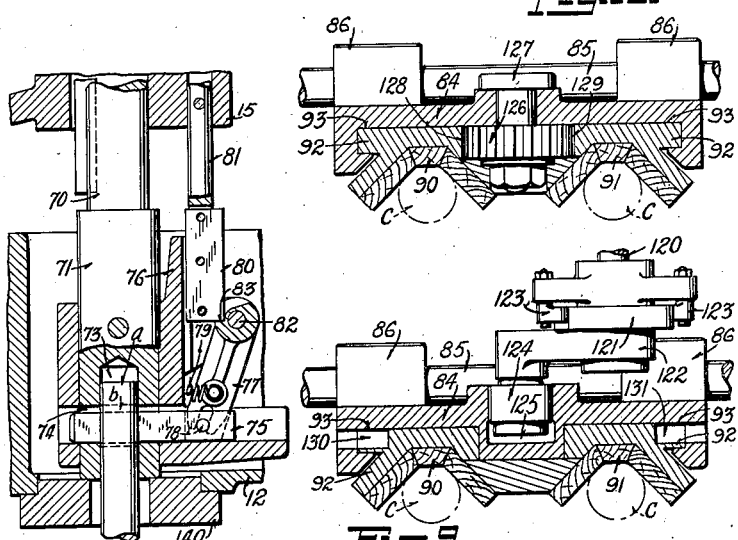
INVENTOR
WALTER FERRIS
BY
ATTORNEY Nov. 14, 1933.     W. FERRIS     1,935,551
BROACHING MACHINE
Original Filed June 1, 1926    8 Sheets-Sheet 7

INVENTOR
WALTER FERRIS.
BY
ATTORNEY

Nov. 14, 1933.    W. FERRIS    1,935,551
BROACHING MACHINE
Original Filed June 1, 1926    8 Sheets-Sheet 8

INVENTOR
WALTER FERRIS
BY
ATTORNEY

Patented Nov. 14, 1933

1,935,551

UNITED STATES PATENT OFFICE 1,935,551

BROACHING MACHINE

Walter Ferris, Milwaukee, Wis., assignor to The Oilgear Company, Milwaukee, Wis., a corporation of Wisconsin Application June 1, 1926, Serial No. 112,871
Renewed April 10, 1933

22 Claims. (Cl. 90—33)

This application is a continuation in part of application Serial No. 544,534 which was filed March 17, 1922, and has since matured into Patent No. 1,823,975.

This invention relates primarily to upright, pull-broaching machines, although certain novel features thereof may be used to advantage in machines of other types.

A general aim of the present invention is to improve the construction and operation of machines of this type.

Other objects are to provide improved means for effecting and controlling operation of the tool draw-head; to provide improved tool handling mechanism for advancing and retracting the tool into and out of engagement with the draw-head before and after each cutting stroke; to provide such mechanism capable of handling a plurality of tools so as to apply them successively to the draw head; to provide means for automatically attaching a tool to and releasing the same from the draw-head; and to so combine and coordinate the parts as to render the machine entirely automatic.

Other objects and advantages will appear from the following description of an illustrative embodiment of the present invention.

In the drawings:

Fig. 4 is a plan view, partly in section, with the forward portion of the head frame removed. In this figure the machine has been split along a vertical transverse plane, and the forward portion shifted into a strictly vertical position in order to better illustrate the parts.

Figs. 5 and 6 are horizontal sectional views taken on the line 5—5 of Figure 2, illustrating the parts in various operating positions.

Fig. 7 is a rear elevation of the control housing shown in Figures 2, 4, 5 and 6.

Fig. 8 is a longitudinal section of the tool carrier.

Fig. 9 is a section on line 9—9 of Figure 8.

Fig. 10 is a section on line 10—10 of Figure 8.

Fig. 11 is a detail view of the key operating mechanism.

Fig. 12 is a similar view illustrating the position of the parts with the key inserted.

Figure 1:
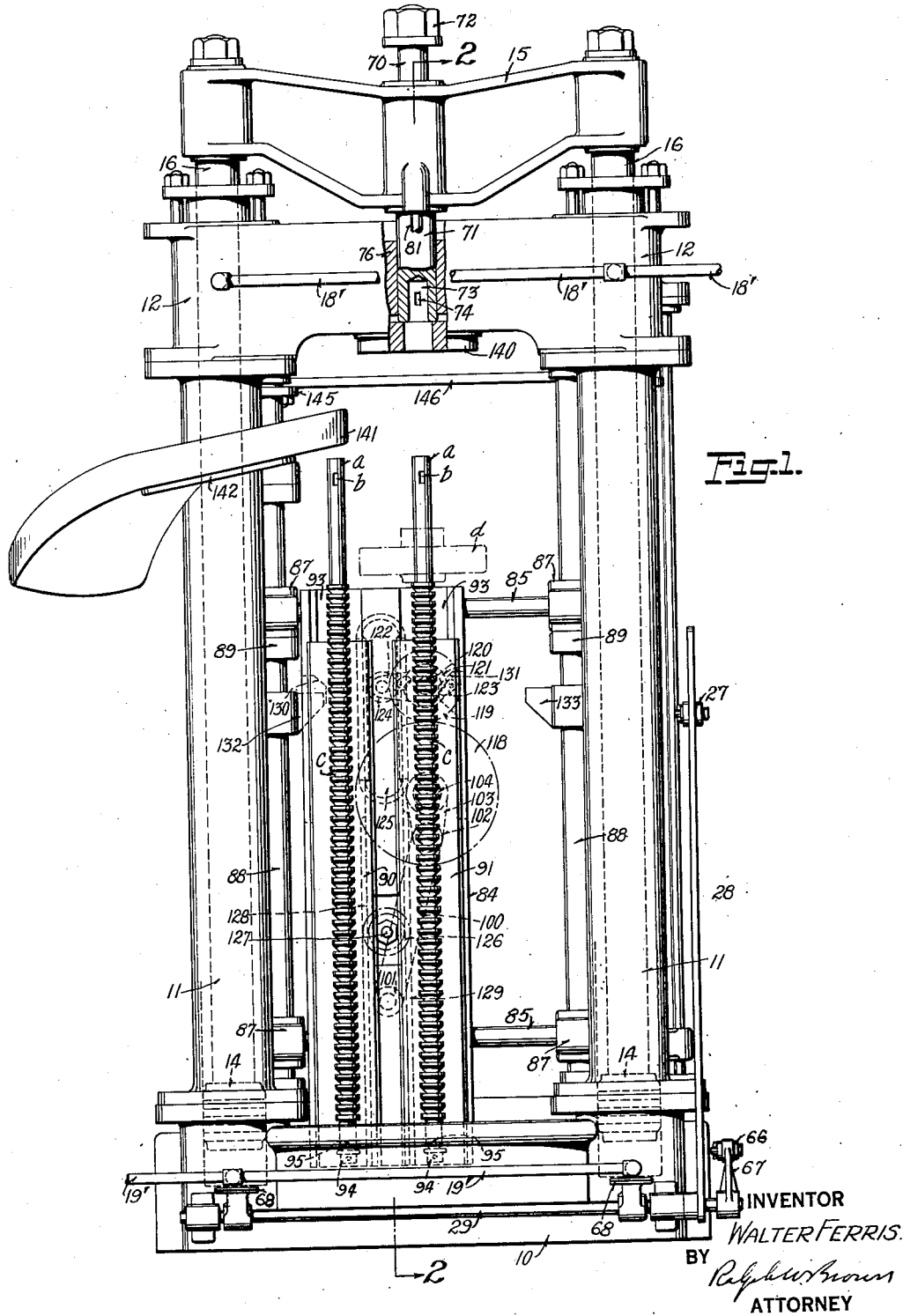
Fig. 1 is a front view of a broaching machine constructed in accordance with the present invention.

The machine selected for illustration comprises a base 10 having a pair of laterally spaced columns 11 rising from the forward portion thereof. A head frame 12 is supported by the columns 11 and by an upright frame 13, firmly anchored in the base. The columns 11 are of hollow form and constitute power cylinders which enclose pistons 14 closely fitted for reciprocation therein. The pistons 14 are connected in driving relation with the opposite ends of a draw-head 15 through rods 16, projecting through and guided by the head frame 12.

The pistons 14 are hydraulically driven by liquid supplied from a positive, smooth delivery, variable displacement pump 17. The pump is connected to the upper ends of the cylinders 11 through a pipe 18 and branch pipe 18', and to the lower ends of the cylinders through pipe 19 and branch pipe 19'. The pump shown is fully described in my prior Patent No. 1,558,002, issued October 20, 1925. It will therefore suffice here to say that it is driven at substantially constant speed through a belt and pulley 20, and that the rate and direction of liquid discharged by the pump is controlled by a stem 21 projecting from the pump casing. With the stem 21 in the neutral position shown in Figure 4, pump displacement is zero and there is no flow of liquid in either of pipes 18 or 19. When the stem 21 is forced outwardly with respect to the pump casing the pump delivers liquid through pipes 19 and 19' into the lower ends of the cylinders at a rate corresponding to the extent of adjustment of the stem, causing the pistons 14 and draw-head 15 to travel upwardly at a corresponding rate. During this upward travel liquid escapes from the upper ends of the cylinders 14 through pipes 18' and 18 back to the pump. When the stem is shifted inwardly from neutral position the pump discharges into pipes 18 and 18' at a rate corresponding to the position of the stem, and liquid flows into the upper ends of the cylinders 11, causing the pistons 14 and draw-head 15 to lower at a corresponding rate, liquid from the lower ends of the cylinders returning to the pump through pipes 19 and 19'.

In this instance the stem 21 is operated and controlled by an arm 22, engaged therewith, and fixed to the lower end of a vertical control shaft 23, journalled adjacent its lower end in an appropriate bracket 24 fixed to the pump casing. The shaft 23 extends upwardly into a control box or housing 25 through which it is automatically controlled in a manner to be hereinafter described. This shaft is also placed under the control of the operator through an arm 26, fixed thereto, and connected through a link 27 with an appropriate hand lever 28, loosely mounted upon a rock shaft 29 extending across the front of the base 10 of the machine.

Provision is made in the machine shown for placing the shaft 23 under the control of the draw-head 15. Although this might be effected in various ways, satisfactory mechanism for the purpose is illustrated in Figures 2, 3, 4, 5, 6 and 7. This mechanism includes a block 30 mounted for reciprocation upon a pair of upright guide rods 31 fixed at their opposite ends in the base 10 and head-frame 12 of the machine. A rod 32, fixed to and depending from the draw-head 15, extends parallel with and between the guide rods 31, and is fixed at its lower end to the block 30, so that the block 30 moves in unison with the draw-head. An upright cam shaft 33, journalled at its opposite ends in the base and head-frame of the machine, extends parallel with and adjacent the rods 31 and 32. An upper cam 34 and lower cam 35, adjustably fixed to the cam shaft, project into the path of travel of a stud 36, projecting laterally from the block 30. The surfaces of these cams are so shaped that when the stud 36 in its downward travel strikes the lower cam 35, the cam shaft is rotated into the position shown in Figure 4, and when the stud 36, in its upward travel, strikes the upper cam 34, the cam shaft is turned counter-clockwise from the position shown.

The cam shaft 33 carries an arm 37, fixed thereto, and connected through a link 38 with an arm 39 fixed to a rock shaft 40, journalled in and projecting through the top wall of the housing 25. An arm 41 within the housing 25 is fixed to shaft 40 and carries a depending pin 42. A tension spring 43 connects pin 42 with an upright pin 44 carried by an arm 45 fixed to the upper end of the pump control shaft 23. A pair of set screws 46 and 47, adjustably fixed in brackets 48 within the housing, cooperate with a lug 49, projecting from the rear of the arm 45, to limit the swing of the arm in either direction.

A pair of pivoted dogs 50 and 51, mounted on pins 52 in brackets 48, cooperate with a tooth 53 on the lug 49, to releasably retain the arm 45 in the intermediate neutral position of Figure 5. A spring 54 connecting these dogs yieldably retain them in the positions shown in this figure against stop pins 55 in the brackets 48. Either or both of the dogs 50 and 51 may be retracted from engagement with the tooth 53 through links 56 and 57 pivotally connected thereto and extending through a slot 58 in the rear wall of the housing. Each link has a slot 59 therein (see Fig .2) adapted to receive one end of a pin 60 projecting in opposite directions from an arm 61 carried by a rock shaft 62, supported upon the rear wall of the housing. The arm 61 is disposed between the links. The arrangement is such that when the shaft 62 is rotated so as to swing the arm 61 toward the left, (Figs. 2 and 5) the links 56 and 57 are shifted toward the left and the dogs 50 and 51 disengaged from the tooth 53 on the arm 45, so that the arm 45 is then free to swing in either direction under the influence of the spring 43.

The rock shaft 62 is actuated and controlled by an arm 63, fixed to one end thereof, and connected through a link 64 with a bell-crank 65 rockably supported on the base 10. The bell-crank is connected through a link 66 with an arm 67 fixed to the rock shaft 29 at the front of the machine. The rock shaft 29 may be actuated by either of two pedals 68 fixed thereto. When either of these pedals are depressed by the foot of the operator, the shaft 62 is rotated clockwise (Fig. 2) and the links 56 and 57 shifted to retract the dogs 50 and 51 as above described.

Either or both dogs 50 and 51 may be retracted from active position by removing its link 56 or 57 from the pin 60 on the arm 61, and swinging the same into an end of the slot 58. In Figure 5 link 56 is shown, in dotted lines, so removed. In this position dog 50 is retracted and is no longer under the influence of the rock shaft 62. In Figure 7 both links are so removed and are retained in this position by their engagement within the downwardly inclined ends 58' of the slot 58. The links are preferably provided with appropriate handles 69.

The arm 41 is actuated by the arm 39 (which is actuated by the cam shaft 33) so as to cause the pin 42 to swing through an arc between the positions shown in Figures 5 and 6. With the pin 42 in the position shown in Figure 5 the spring 43 acting on pin 44 tends to swing the arm 45 upwardly, so that when dog 51 is retracted, arm 45 swings into the dotted line position of this figure, which position is determined by the set screw 47. This movement of the arm 45 causes the pump control shaft 23 to turn through a corresponding angle, the pump control stem 21 is shifted outwardly and the pump delivers liquid into pipes 19 and 19'. When the pin 42 is swung into the position of Figure 6 the spring 43, acting on arm 45, swings it down, until the tooth 53 thereon is engaged by the dog 50 and the arm is retained in the intermediate position of Figure 5. In this position pump displacement is zero. Thus when dog 50 is retracted the arm 45 swings down until the lug 49 engages screw 46. The pump is thus reversed and delivers liquid into the pipes 18 and 18'. When the pin 42 is again swung to the position of Figure 5, the spring 43 again pulls on pin 44 in such direction as to swing the arm 45 upwardly until dog 51 engages the tooth 53, and the arm is returned into intermediate or neutral position. With the dog 51 permanently retracted the arm 45 is of course free to swing from the full line position to the lower dotted line position of Figure 6, without interruption, to thereby completely reverse the pump; and with dog 50 permanently retracted the arm 45 is free to swing from the lower dotted line position to the full line position, to again completely reverse the pump.

A draw-bar 70 is mounted for limited lengthwise movement within the draw-head 15. The lower enlarged end 71 of the bar limits its upward movement within the head and a nut 72 on the upper end of the bar limits its downward movement within the head. The bar 70 is provided at its lower end with a socket 73, for receiving the nose $a$ of a broaching tool, and with a transverse slot 74, for receiving a key 75, adapted to pass through a corresponding slot $b$ in the tool. The key 75 is mounted within a bracket 76, fixed to the end of the draw-bar, and is controlled by a lever 77, having a pin and slot connection 78 therewith. A spring 79, acting on the lever 77, tends at all times to force the key 75 into locking position. The lever 77, however, is controlled by a cam plate 80, carried by a rod 81 fixed to and depending from the draw-head 15. The lever 77 is mounted upon a pin 82, fixed in the bracket 76, the upper end of the lever being cut away to accommodate the plate 80 and to form a shoulder 83 for cooperation therewith. With the plate 80 in the lower position of Figure 11, the forward edge thereof, engaging the shoulder 83, retains the lever 77 in the position shown with the key retracted. When the plate 80 is lifted so as to clear the shoulder 83, the lever 77 rocks under the action of spring 79, and the key 75 is forced through the slot 74 and nose of the tool, as indicated in Figure 12. When the plate 80 is lowered the lower edge thereof engages the shoulder 83 on the lever and rocks the same into the position of Figure 11, and the key 75 is withdrawn.

In the machine shown provision is made for lifting a tool into engagement with the draw-bar 70 before each cutting stroke and for receiving the tool after each return stroke. Mechanism for this purpose includes a plate-like carrier 84 mounted for lateral movement along a pair of horizontal bars 85. Each bar passes loosely through a pair of ears 86 cast integral with the carrier 84 and projecting from the rear face thereof. Each bar is provided with bosses 87, at the opposite ends thereof, fitted for reciprocation along upright guide bars 88, fixed at their upper and lower ends in the head frame 12 and base 10, respectively, of the machine. The carrier frame 84 may thus be shifted laterally along the bars 85 and also vertically with the bars 85 along the upright guide bars 88. Stops 89 on the bars 88 limit the downward movement of the carrier frame.

Figure 2:
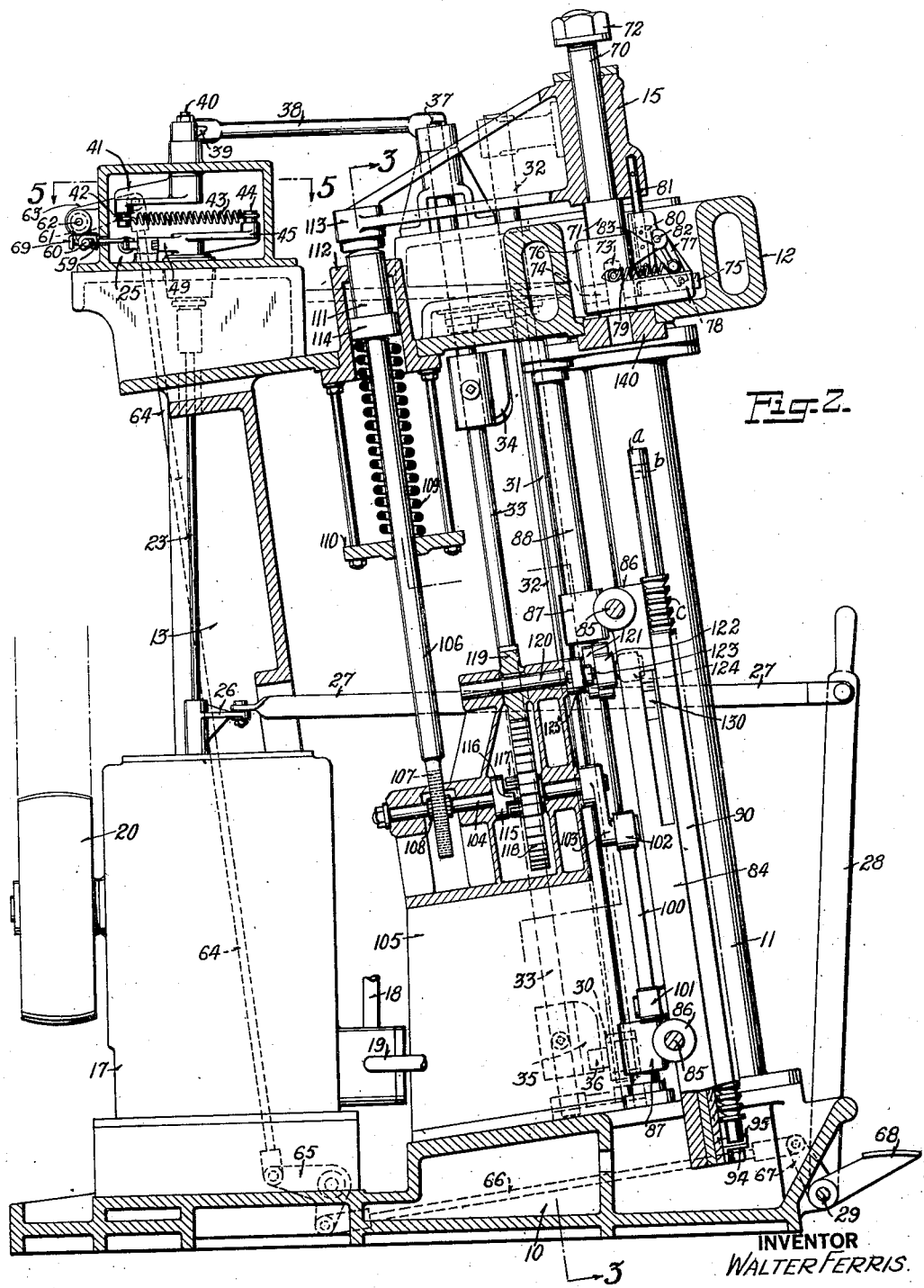
Fig. 2 is a vertical section taken substantially along the line 2—2 of Figure 1.
Figure 3:
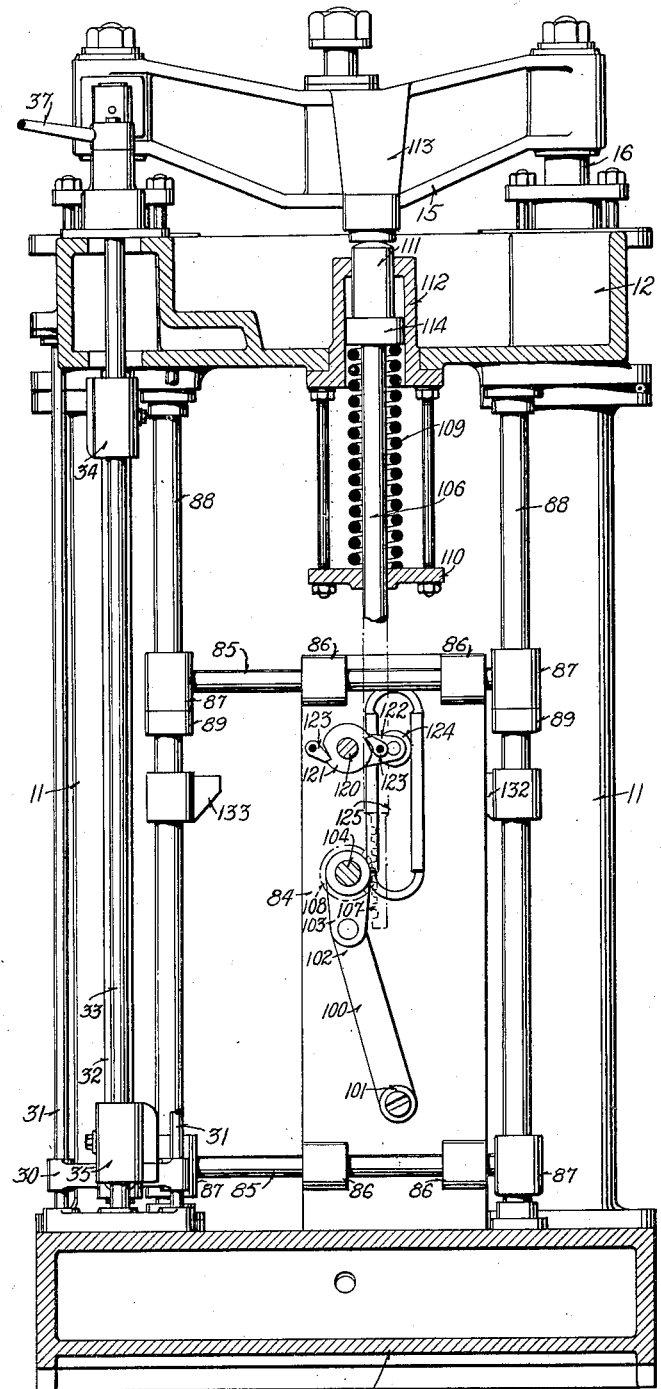
Fig. 3 is a vertical section, taken substantially along the irregular line 3—3 of Figure 2.

Two upright troughs 90 and 91 are mounted for lengthwise reciprocation upon the carrier frame 84. Each is fixed to a slide plate 92, guided in ways 93 in the front face of the carrier frame. From an inspection of Figures 9 and 10 it will be noted that each trough is substantially V-shaped, so as to support and guide the tools C, and they are preferably made of wood or other material that will not mar or injure the tools. It will also be noted from an inspection of Figure 2 that the carrier 84 and troughs are inclined from the true vertical. This inclination is sufficient to retain the tools by gravity within the troughs. The whole front of the machine, including the cylinders 11, are similarly inclined so that the draw-head 15 may reciprocate in a plane parallel to the tool carrier frame. A tool supporting bracket 94 is fixed within the lower end of each trough. As indicated in Figures 1 and 2 each bracket 94 is provided with a horizontal, relatively sharp straight edge 95 adapted for engagement within a similarly formed notch 96 in the lower end of each tool. The straight edge and notch cooperate to retain the tool in position with the key-slot b therein parallel to the slot 74 in the draw-bar 70.

The carrier frame is reciprocated vertically by a link 100, connected at its lower end 101 to the frame, and at its upper end 102 with a crank 103, fixed to one end of a drive shaft 104. Shaft 104 is journaled in a support 105 mounted upon the base of the machine, and is actuated by a bar 106, having rack teeth 107 on the lower end thereof meshing with a pinion 108 formed on the shaft. A compression spring 109, supported by a bracket 110, depending from the head-frame 12 of the machine, bears upwardly against a head 111 on the bar 106, and tends at all times to raise the bar. The bar is guided within the bracket 110 and a hollow boss 112 formed in the head frame. The head 111 of the bar projects upwardly through the boss 112 into engagement with a rigid arm 113, fixed to and projecting rearwardly from the draw-head 15. A flange 114 on the head 111 limits the upward movement of the bar 106.

The arrangement is such that with the draw-head 15 in the lowermost position of Figure 2, the bar 106 is depressed and the crank 103, link 100, and carrier frame 84 are in the lower position shown. As the draw-head 15, and consequently the arm 113, rises, the bar 106 rises under the action of spring 109, and the pinion 108, shaft 104, and crank 103 are rotated through substantially one hundred eighty degrees, to thereby raise the carrier frame. As the draw-head 15 approaches the end of its downward stroke, the arm 113 again engages the head 111 and forces the bar 106 downwardly, so as to rotate the shaft 104 and crank 103 in the opposite direction, and the carrier frame is returned to its lowermost position.

The shaft 104 also carries a coupling disk 115 fixed thereto and provided with teeth 116 cooperating with teeth 117 projecting from a gear 118 loosely mounted on the shaft. The teeth 116 and 117 are so disposed and proportioned as to provide considerable lost motion between the disk 115 and gear 118. In fact the lost motion is sufficient to permit rotation of the disk 115 through substantially ninety degrees before rotation is imparted to the gear.

The gear 118 meshes with a gear 119 which is one-half the diameter of the gear 118 and is fixed on a shaft 120 journaled in the upper end of the support 105.

A crank arm 122 is loosely mounted upon the forward end of shaft 120, and a ratchet wheel 121, also loose on the shaft, is fixed to this crank arm. An element 123', fixed to the shaft 120 adjacent the ratchet wheel 122, carries a pair of pawls 123, pivoted thereon and cooperating with the ratchet wheel. (See Figures 2, 3, 4 and 9.) The arrangement is such that during rotation of the shaft 120 and element 123' in one direction (clockwise in Figure 3) the pawls 123 ride around the ratchet wheel 121 without disturbing the position of arm 122, but when shaft 120 and element 123' are rotated in the opposite direction, the pawls 123 engage the teeth of the ratchet wheel causing the same to turn, with the arm 122, in the same direction. Thus during each upward stroke of the bar 106, shaft 104 is rotated counter-clockwise, (Fig. 3) and the arm 103 is swung upwardly through an angle of one hundred and eighty degrees; and during the latter half of this rotation, gear 118 drives gear 119 so as to cause the shaft 120 to rotate through one hundred and eighty degrees in a clockwise direction (Fig. 3), the arm 122 remaining in the position shown in this figure. During each down stroke of the bar 106, the shaft 104 is rotated clockwise (Fig. 3) and the arm 103 returned to the lower position of this figure; during the latter half of this rotation gear 118 drives gear 119 so as to cause shaft 120 to rotate counter-clockwise through one hundred and eighty degrees, and causing the pawls 123 to rotate the ratchet wheel 121, and arm 122, through one hundred and eighty degrees in a counter-clockwise direction.

Figure 15:
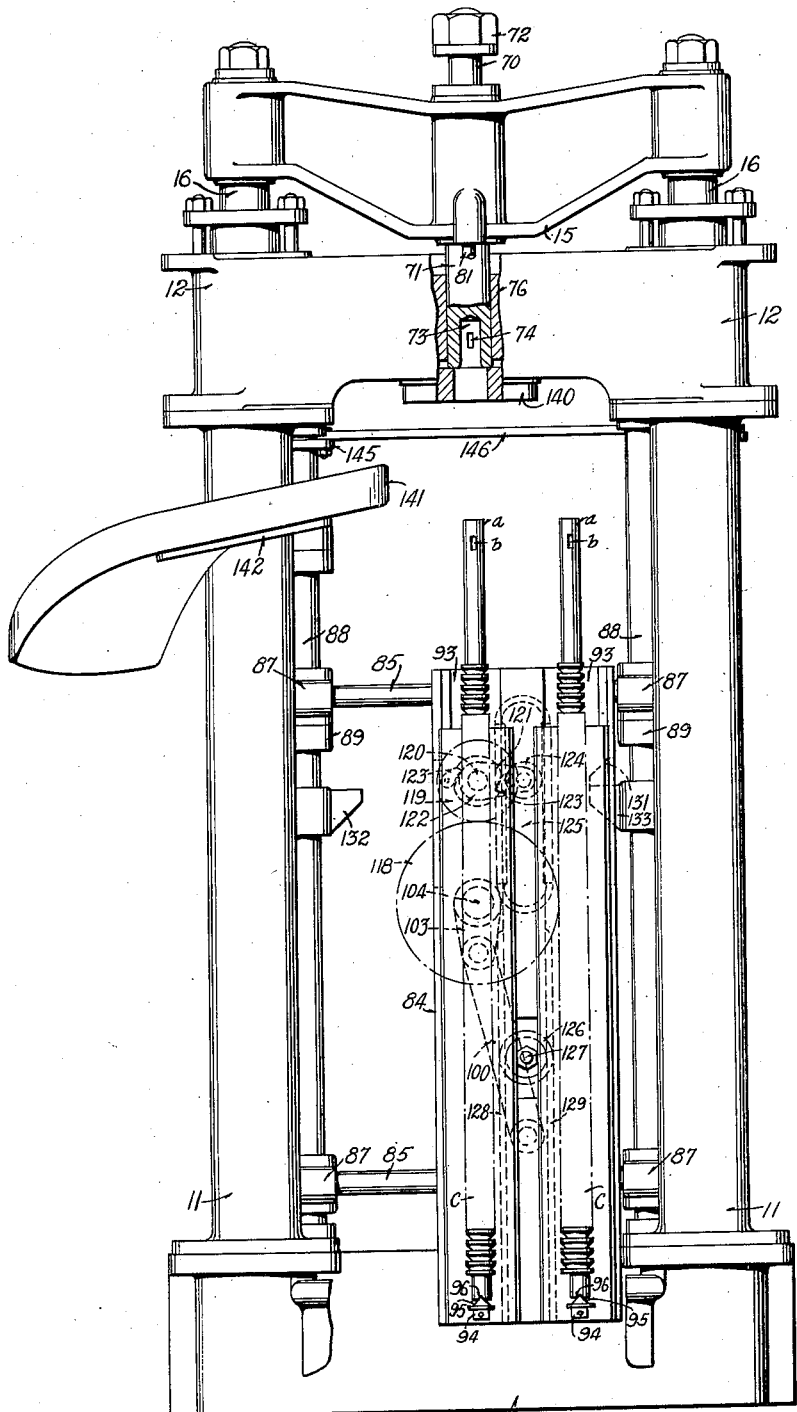

A roller 124 on the arm 122 engages within a vertical slot 125 in the upper end of the carrier frame 84, so that upon each one hundred and eighty degree rotation of arm 122 the carrier frame 84 is shifted laterally. Thus upon each up stroke of the bar 106 the carrier frame is elevated, and arm 122 remains at rest; but during the latter part of each down stroke of the bar 106 and carrier frame 84, the arm 122 is rotated counter-clockwise (Fig. 3) through one hundred and eighty degrees, and the carrier frame is shifted laterally. Thus during the latter part of one down stroke the carrier frame 84 is shifted from the position of Figure 1 to that of Figure 15, and during the latter part of the next down stroke it is returned to the position of Figure 1. This lateral shifting of the carrier frame brings the troughs 90 and 91 into alignment with the draw bar 70, alternately.

Figure 13:
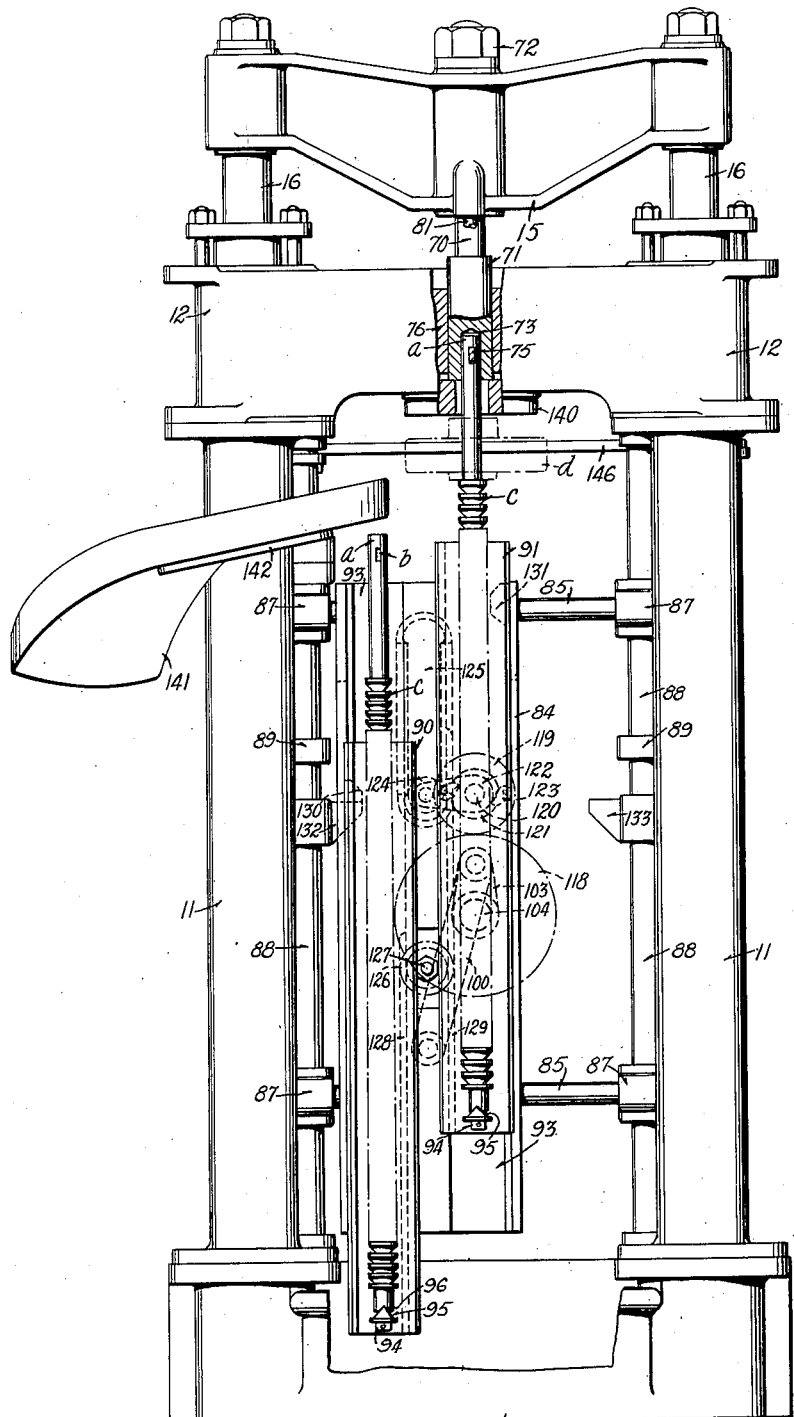
Figs. 13, 14 and 15 are front views of the machine illustrating various positions assumed by the parts, during characteristic stages of an operating cycle.

A pinion 126, journalled on a stud 127 in the carrier frame 84 (see Fig. 10) meshes with rack teeth 128 and 129 formed on the inner edges of the slide plates 92. The outer edges of the slide plates are notched as at 130 and 131 (see Fig. 9) to receive lugs 132 and 133, respectively, fixed to the upright bars 88. With the carrier frame 84 in the position shown in Figure 1, lug 132 engages within notch 130, so as to retain the trough 91 against vertical movement, and when the carrier frame is raised into the position shown in Figures 13 and 14, the pinion 126 rolls upon the rack teeth 128 of the fixed slide plate, and cooperating with the rack teeth 129 raises the trough 92 through a distance twice as great as the lift of the carrier frame. With the carrier frame in the position of Figure 15, lug 133 engages within notch 131, so as to retain the trough 92 against vertical movement, and when the carrier frame is raised the pinion 126 acts in a similar manner to raise the trough 91 through a distance twice as great as the lift of the carrier frame.

A brief description of a complete operating cycle will now be given. Let it be assumed that the pump 17 is operating, that the arm 45 is in neutral so that pump displacement is zero, that the draw-head 15 is in the lowermost position, that the carrier frame 84 is in the lower left position of Figure 1, with the trough 91 in alignment with the draw-bar 70, and that the arm 41 has been swung so that the pin 42 and spring 43 are in the position of Figure 5. After passing the work piece d over the nose of the tool, as indicated in Figure 1, the operator starts the machine by depressing one of the pedals 68, to thereby operate the rock shaft 62 and retract the dogs 50 and 51 from engagement with the tooth 53 on the arm 45. The arm 45, thus released, swings into the dotted line position of Figure 5, so that the control shaft 23 is rotated and the stem 21 of the pump shifted outwardly to cause the pump 17 to deliver liquid through pipes 19 and 19' into the lower ends of cylinder 11 and to receive liquid through pipes 18' and 18 from the upper ends of the cylinders. The draw-head 15 then begins its upward travel under the action of pistons 14.

During the initial upward movement of the draw-head 15, the draw bar 70 remains in the lower position shown, resting by gravity upon the lower internal face of the head frame 12. During this initial movement of the draw-head, arm 113, carried thereby, releases the head 111 of bar 106 and permits the same to move upwardly, so that the crank 103 is rotated, and the tool carrier frame raised in the manner above described. This movement of the carrier frame causes the trough 91 to be raised into the position of Figure 13 to thereby enter the nose a of the tool therein into the socket 73 in the draw-bar. Simultaneously the plate 80 moves upwardly with the draw-head 15, until the end thereof clears the shoulder 83 on the lever 77, when the lever 77 swings, under the action of spring 79, and slides the key 75 through the slot b in the nose a of the broaching tool. The draw-head 15 then engages the nut 72 on the upper end of the draw-bar 70, the draw-bar thereafter moving upwardly with the draw-head, pulling the tool through the work on a cutting stroke. During this upward travel of the tool the work bears against the usual bushing 140, mounted in the head frame 12.

Figure 14:
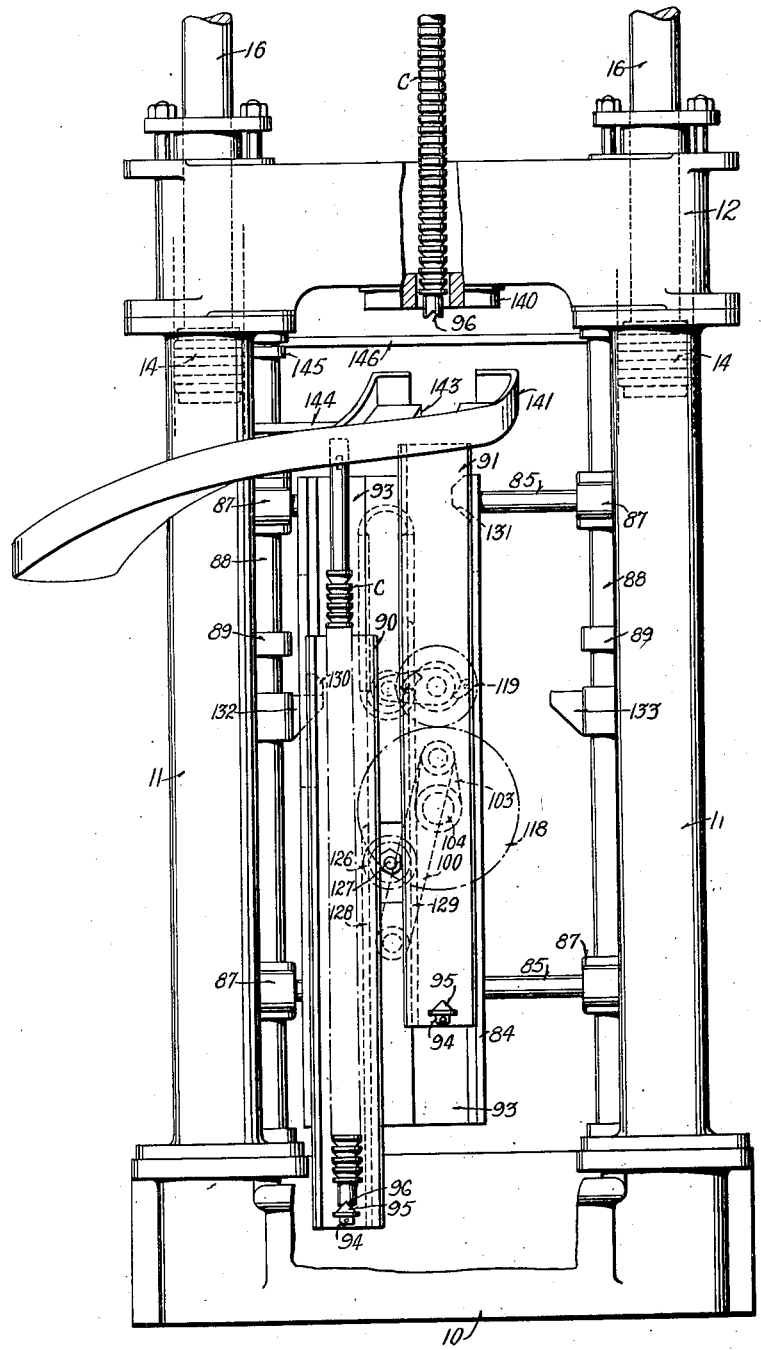

The draw-head 70 and tool continue this upward travel until the tool reaches the position such as shown in Figure 14, or until the bottom tooth on the tool has passed through the work. The work then falls by gravity away from the bushing 140. As the draw-head 15 approaches this upper limit of its stroke, the stud 36 on the block 30, carried thereby, strikes the upper cam 34 on the cam shaft 33, so as to rotate the same counterclockwise. (Fig. 4.) This action of the cam shaft causes the arm 41 to swing in the same direction, to thereby shift the pin 42 thereon into the position shown in Figure 6. The arm, under the action of spring 43, then swings into the intermediate position of Figure 5, and pump displacement is reduced to zero. This brings the draw-head 15 and draw bar 70 to rest.

The operator then depresses one of the pedals 68, so as to release the dogs 50 and 51, and the arm 45 swings into the lower dotted line position of Figure 6, to thereby cause the pump to deliver liquid through pipes 18 and 18' into the upper ends of cylinders 11 and to receive liquid from the lower ends of the cylinders through pipes 19' and 19. The draw-head 15 then starts downwardly.

As the draw-head 15 approaches the lower end of its downward stroke, the draw-bar 70 engages the lower internal surface of the head frame 12 and comes to rest. Continued downward movement of the draw-head 15 forces the plate 80 downwardly, and this plate, bearing against the shoulder 83 on the lever 77, swings the lever outwardly to withdraw the key 75. The tool, thus released, falls into the trough 91. The arm 113 carried by the draw-head, in the mean time, engages the head 111, and forces the bar 106 downwardly, so that the crank 103 is swung downwardy and the tool carrier frame 84 lowered. During the latter part of the downward swing of the crank 103, the crank 122 swings through one hundred and eighty degrees into the position shown in Figure 15, thereby shifting the carrier frame 84 into the position shown in this figure, in which position trough 90 is aligned with the draw-bar 70, and the lug 133 is engaged in the slot 131 in the slide plate 92 to which trough 91 is attached.

Also as the draw-head 15 approaches the lower end of its downward stroke, the lower cam 35 is engaged and rotated by the stud 36 on the block 30, so that the cam shaft 33 is rotated clockwise. This action of the cam shaft causes the arm 41 to be swung clockwise so as to return the pin 42 to the position of Figure 5, and so that the spring 43, shifts the arm into the intermediate, full line position of this figure. This reduces pump stroke to zero and the draw-head 15 again comes to rest. This completes one cycle.

The operator then places the work piece over the nose of the tool disposed in trough 90 and again depresses one of the pedals 68 to again start the draw-head upwardly. The carrier frame 84 is again raised in the manner described and the trough 90 rises and enters the nose of its tool into the slot 73 in the draw-bar. The key 75 is again inserted in the manner above described and the draw-head and draw-bar travel upwardly until the upper end of the stroke is reached when they again come to rest. The operator then depresses one of the pedals 68 and the draw-head and draw-bar start a downward stroke. At the lower end of the down stroke the key 75 is again released, the tool drops into trough 90, the carrier frame and trough 90 are lowered and the draw head again comes to rest. During the lowering of the carrier frame the crank 121 rotates through another one hundred eighty degrees in a counter-clockwise direction into the position shown in Figure 1, and the carrier frame is thereby returned into the left position of this figure.

The two tools are thus passed through the work alternately without requiring any handling of the tools by the operator. One tool may be a roughing tool and the other a finishing tool, or the two tools may be identical, the alternate use giving additional time for cooling the tools.

Provision is made in the machine shown for receiving the work as it falls from the tool at the end of each cutting stroke and for discharging the same at a convenient point. The mechanism shown for this purpose comprises a chute 141, mounted upon an arm 142, supported to swing about one of the upright bars 88. The forward end of the chute is provided with a slot 143 adapted to accommodate the tool when swung into work receiving position beneath the bushing 140. The arm 142 is extended rearwardly, as at 144, and is connected through a link 145 with an arm 146 fixed to the cam shaft 33. The arrangement is such that as the draw head 15 approaches the upper end of its cutting stroke, and the cam shaft 33 is rotated in the manner hereinabove described, the chute 141 is swung from the full line position into the dotted line position of Figure 4, with the upper forward end thereof beneath the bushing 140. (See Fig. 14.) In this work receiving position the chute receives the work, as it falls from the tool, and delivers it to the left of the machine. The chute retains this position until the draw head 15 approaches the lower end of the return stroke, where the cam shaft 33 is again actuated and the chute returned into the dotted line position of Figure 4. (See also Figs. 1, 13 and 15.) During the downward or return stroke of the draw head, the tools pass freely through the slot 143 in the forward end of the chute.

The broaching machine herein set forth is susceptible of various modifications without departing from the scope of the invention as hereafter claimed.

The invention is hereby claimed as follows.—

1. In a broaching machine the combination of a base, spaced cylinders rising from said base, a head frame on and supported by said cylinders, a tool reciprocating member above said head frame, pistons in said cylinders for reciprocating said member, and means for delivering a driving liquid to said cylinders to operate said pistons.

2. In a broaching machine the combination of a member for sustaining the pressure of the work, tool actuating means cooperating with said member to pull a tool through the work, means for supporting a plurality of tools below said member, means for operating said tool supporting means to align said tools successively with said tool pulling means, and means for reciprocating said tool supporting means to lift an aligned tool into engagement with said tool actuating means.

3. In a broaching machine the combination of a member for sustaining the pressure of the work, tool pulling means cooperating with said member to pull a tool through the work, a plurality of tool holders laterally movable to align the tools successively with said actuating means and individually movable to engage the tools successively with said pulling means.

4. In a broaching machine the combination of means for driving a broaching tool through a piece of work, a plurality of tool holding troughs, means for shifting said troughs laterally to align the tools successively with said driving means, and means for operating said troughs successively to advance the aligned tool into engagement with said driving means.

5. In a broaching machine the combination of means for driving a broaching tool through a piece of work along a substantially upright inclined path, a plurality of tool receiving troughs disposed substantially parallel to said path, means for shifting said troughs laterally to align said tools successively with said driving means, and means reciprocating said troughs successively to lift the aligned tool into engagement with said driving means.

6. In a broaching machine the combination of means for driving a broaching tool through a piece of work along a definite path, a plurality of tool holders laterally movable to position the tools successively in said path, and means operating said holders successively to advance the tools into engagement with said driving means successively.

7. In a broaching machine the combination of tool driving means, and means for advancing a plurality of tools successively into engagement with said driving means, said tool advancing means comprising a plurality of tool holders, a carrier for said holders, means for reciprocating said carrier laterally to align the tools successively with said driving means, and means for reciprocating said holders on said carrier to advance the tools successively into engagement with said driving means.

8. A tool handling mechanism for broaching machines comprising a pair of tool holders, means for shifting said holders to shift the same laterally, means simultaneously operable upon said holders to urge the same longitudinally, and means opposing the action of said last named means to restrain said holders against longitudinal movement alternately.

9. A tool handling mechanism for broaching machines comprising a pair of tool holders, a carrier therefor, means for operating said carrier to shift said holders laterally and to urge both holders longitudinally, and means engageable with said holders alternately to restrain the same against longitudinal movement with said carrier.

10. A tool handling mechanism for broaching machines comprising a carrier, a pair of tool holders mounted for lengthwise movement thereon, a pinion on said carrier, racks on said holders meshing with said pinion, means for operating said carrier to shift said holders laterally and longitudinally, and means operable alternately on said holders to hold one against longitudinal movement during the longitudinal movement of the other.

11. A tool handling mechanism for broaching machines comprising a frame, a carrier, a pair of tool holders mounted for longitudinal movement on said carrier, a pinion on said carrier, racks on said holders meshing with said pinion, stops on said frame, means for shifting said carrier laterally to engage said stops with said holders alternately, and means for shifting said carrier longitudinally to effect longitudinal movement of that holder not engaged with said stop.

12. In a pull broaching machine the combination of a tool pulling member for pulling a broaching tool through the work, driving means therefor, and means controlled by the initial action of said driving means for advancing a tool into engagement with said pulling member.

13. In a pull broaching machine the combination of a tool pulling member for pulling a broaching tool through the work, driving means therefor, lost motion connections between said driving means and member permitting initial movement of said means independently of said member, and means controlled by said driving means for advancing a tool into engagement with said member during said initial movement of said means.

14. In a pull broaching machine the combination of a draw head, a draw bar mounted for limited lengthwise movement therein, and means automatically operable during relative movement between said head and bar to advance a tool into engagement with said bar.

15. In a pull broaching machine the combination of a draw head, a draw bar mounted for limited lengthwise movement therein, means for connecting a tool in driving relation with said draw bar, and means controlled by relative movement between said bar and head for applying and releasing said connecting means.

16. In a pull broaching machine the combination of tool pulling means, driving means, lost motion connections between said pulling means and driving means, means for connecting a tool in driving relation with said pulling means, and means controlled by relative movement between said driving and pulling means for applying and releasing said connecting means.

17. In a pull broaching machine the combination of a tool pulling member for pulling a tool through the work, said members having a tool receiving socket therein, a key for securing the tool in said socket, driving means for said member, and means controlled by said driving means for applying and releasing said key.

18. In a pull broaching machine the combination of a tool, a tool pulling member, a key for locking the tool therein, means for shifting the tool into engagement with said member, a slot in said tool for receiving said key, a notch in said tool, and means on said shifting means cooperating with said notch to align said key and slot.

19. In an upright pull broaching machine the combination of a member for sustaining the pressure of the work, tool reciprocating means cooperating with said member to pull the tool upwardly through the work on a cutting stroke, means for receiving the work from said member after each cutting stroke, and means for shifting said receiving means into and out of work receiving position beneath said member.

20. In a broaching machine the combination of a tool reciprocating member, hydraulic means for driving said member, means including an element movable through a neutral position for reversing said driving means, means controlled by said driving means for actuating said element, a dog normally operable to interrupt the movement of said element in one direction at neutral position, a second dog normally operable to interrupt the movement of said element in the other direction at neutral position, and means for releasing said dogs simultaneously to permit continued movement of said element.

21. In a broaching machine the combination of a tool reciprocating member, hydraulic means for driving said member, means including an element movable through a neutral position for reversing said driving means, means controlled by said driving means for actuating said element, a dog normally operable to interrupt the movement of said element in one direction at neutral position, a second dog normally operable to interrupt the movement of said element in the other direction at neutral position, means for simultaneously releasing said dogs to permit continued movement of said element, and means for selectively rendering either of said dogs inactive on said element.

22. In a broaching machine the combination of a tool reciprocating member, hydraulic means for driving said member, means controlled by said member for reversing said driving means, an element normally operable to interrupt the action of said reversing means in one direction to render said driving means inactive, a second element normally operable to interrupt the action of said reversing means in the other direction to render said driving means inactive, means for operating said elements simultaneously to permit continued action of said reversing means to complete the reversal of said driving means, and means for rendering either of said elements inactive.

WALTER FERRIS.